Patented Feb. 21, 1933

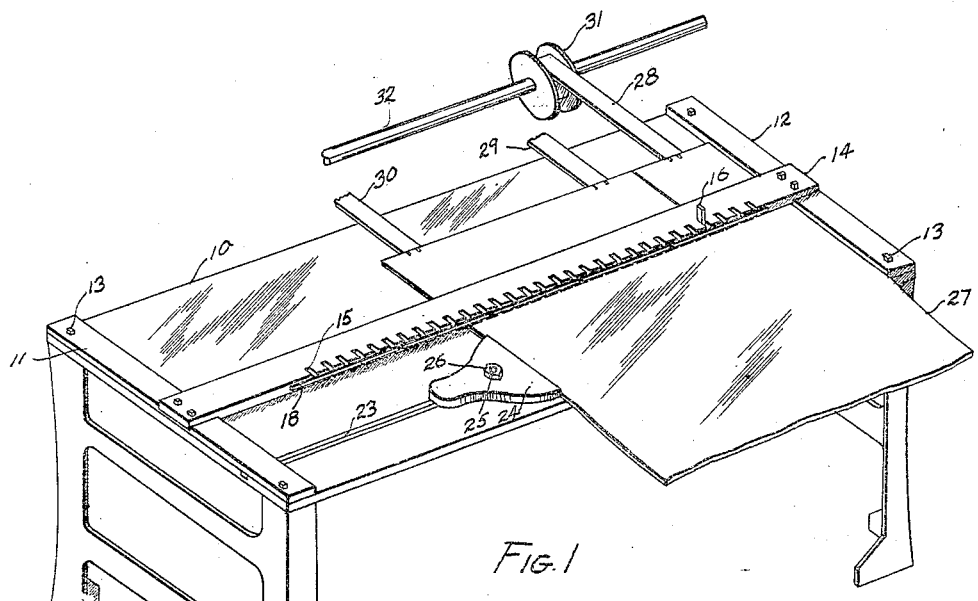
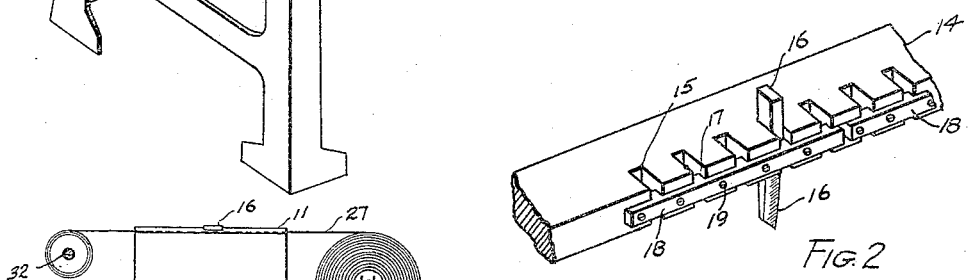
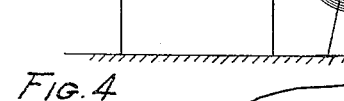
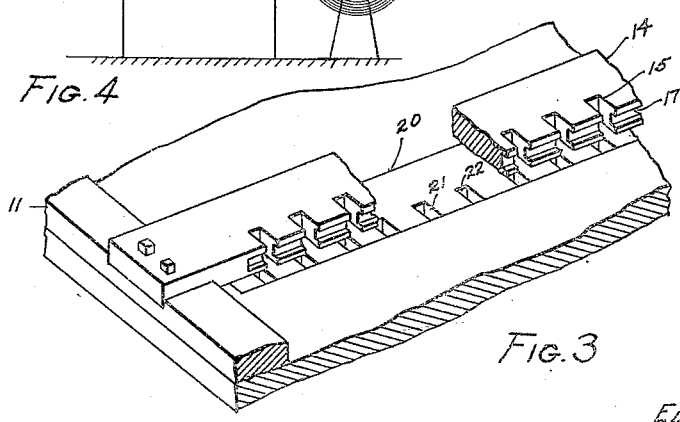

1,898,647

UNITED STATES PATENT OFFICE

EDWARD C. TEUSCHER, OF WEBSTER GROVES, MISSOURI, ASSIGNOR TO TEUSCHER PULLEY & BELTING COMPANY, OF ST. LOUIS, MISSOURI, A CORPORATION OF MISSOURI

CUTTING MACHINE

Application filed November 24, 1930. Serial No. 497,820.

This invention relates to cutting machines, and more particularly to an improved method of and apparatus for cutting wide or stock belts into smaller belts of the more usual commercial widths.

Within the past few years a new form and type of composition belting has been manufactured, which possesses a number of advantages over the older types. The composition belting formerly manufactured and used, was of the round-edge type, this name being given to the material, due to its form of construction. This belting was formed by wrapping a sheet of belting material, that is, the material was wrapped upon itself, the number of plies or folds thereof depending upon requirements in service.

Certain disadvantages of this older type of belting necessitated the development of a new type of belting, involving a new method of manufacture, and the success of the newer type has resulted in a necessity for a machine of the general type to be herein described. The newer types of belting are now made in stock widths of from three to five feet. These wide or stock belts may then be divided, as by cutting, to furnish a number of belts of any desired width. The cut edges are then treated so as to seal the material and prevent any foreign matter from entering between the plies of the belt. Among the advantages derived from the distribution and use of a belting as above described, it may be noted that there exists no exposed or lapped end on the face of the belt which requires cementing, and furthermore, a belting of greater flexibility is obtained. There exists a distinct economy in the practice of cutting belting to exact widths in that the waste formerly incident to the deterioration of belting of odd width may be eliminated.

An object of the present invention is to produce an improved device for readily cutting belting or like materials into any desired width.

An additional object is attained in a belt-cutting device characterized by the principle that the material is led across one or more cutting elements which may be stationary, instead of following the older opposite practice in cutting sheet materials, of providing movable cutting elements.

Another object of this invention is to provide a cutting device in which the material to be cut is drawn through the machine and may be simultaneously wound on a spool or reel.

Still another object of this invention is to provide improved holding means for the cutting elements, such that any combination of the cutters may be simultaneously employed, both as cutting, and as width-gauge elements.

An additional object of the present invention is attained in a device adapted to be employed between a pair or more of winding elements, so disposed that the material may be cut to widths by exposing, at a given time, a minimum length of material between the winding elements and thereby economizing in the space heretofore required in cutting heavy sheet materials of substantial lengths.

Further objects and advantages will appear from the following detailed description of an illustrative embodiment of the invention, and from the drawing, in which:

Fig. 1 is an elevation in perspective of the apparatus, showing a sheet of material as it is being drawn therethrough and cut into predetermined widths; Fig. 2 is a fragmentary elevation in perspective, showing in detail a portion of the means for holding one or more of the cutting knives in position; Fig. 3 is a fragmentary section shown in perspective, of a portion of the table and knife holding member, with a portion of such member removed to show additional means for securing the knives in position with respect to the table, and Fig. 4 is a diagrammatic end elevation of the device showing the preferred relation of the winding elements to the table or body of the device.

Referring now by characters of reference to the accompanying drawing, 10 indicates generally a table or body portion of the machine. Disposed at opposite ends of and extending transversely to the table are a pair of guiding members 11 and 12, which may be secured to the table by means of bolts or the like 13. The members 11 and 12 serve as supports and risers adjacent opposite ends of a knife holding member 14, extending longitudinally of the table. The member 14 is provided adjacent one of its margins, with a plurality of transverse slots or notches 15, spaced at definite intervals and which, as will hereinafter appear, serve as holding seats for any desired number of knives or cutting elements 16. The notches 15 are conveniently employed not merely as holding seats for the cutting elements, but also as width gauges, it being preferred to space these notches, for example, at one inch distances between centers, along the member 14. By this expedient the knives or cutting elements may be set individually, or in groups, to cut the material to the exact widths desired. Extending substantially along and overlying the notched face of the member 14, arranged longitudinally thereof and overlying the said slots, there is provided, for disposition in a series of slots 17, one or more keys 18 adapted to be secured to one of the lateral or forward faces of the member 14, by means of screws 19 and which, when so positioned, bear against the leading edge of the cutting elements or knives, for the securement thereof in rigid engagement with the member 14, in the slots 15. While it will be readily understood that a single key member, such as 18 could be employed for securing the cutting elements in position, the saving of time incident to a plurality of such keys, when removing or rearranging the setting of the knives, warrants the use of a plurality of such key members. By preference in embedded relation with the table top, and disposed directly beneath the member 14, is a member 20, best appearing in Fig. 3, and which extends preferably longitudinally of the table top and parallel to the member 14. This member may be constructed similarly to the member 14, except that its slots are presented vertically to the table surface, and hence it need not be provided with key recesses similar to those shown at 17. As will best appear from Figs. 1 and 3, the members 14 and 20 are preferably spaced vertically. When each of the knives is inserted into a slot such as 15, its lowermost end portion extends into a companion slot, such as 21 in the member 20, so that upon clamping the knife in rigid engagement by the use of a key 18, the back surface of the knife, opposite its cutting edge, will abut the surface 22 of the slot 21. The slots 21 are preferably spaced to conform to the spacing of slots 15, and so register therewith. It will thus appear that, by the provision of companion slots, each of the knives is supported and well reinforced at its opposite ends, thus preventing the knife from flexing when a sheet of material is drawn through the machine and against the cutting edge.

The surface of the table is provided with a longitudinal slot 23 which serves, in the present instance, to direct the movement of, and maintain in desirable alignment, the guiding member 24, which, as appears from Fig. 1, is provided with a material-guiding surface engaging one margin of the pre-cut material, at substantially a right angle to the slot 23. In the bottom of the slot 23 there is also provided a slotted aperture (not shown) of less width than the slot 23, which extends the full length of the table between the members 11 and 12. The preferred arrangement is to maintain the guide 24 in position by means of a tongue (not shown), which fits in the groove or slot 23, a bolt 25 being inserted through the bottom of a table, and through a clamping plate (not shown), thence through the aperture in the slot and up through a suitable aperture in the guide. Upon tightening the nut 26 associated with the last named bolt, the guide may be fixed in any desired adjusted position along the groove 23.

The method of feeding, continuously if desired, the stock belting through the apparatus is thought to be obvious from the foregoing description of the device, but may for completeness, be hereinafter described. A supply coil of belting 27, which may be of substantial width, is brought to the front of the machine, it being understood that the roll may be carried on a shaft-mounted winding member or reel, set in bearings so that the belting may be easily rolled therefrom. The belt may then be conveniently fed into the machine by aligning it with, and abutting it against the member 12, which thus serves as a guide, then placing the movable guide 24 in edgewise engagement with the belt, bringing a desired number of pull-in belts 28, 29 and 30 as in the present illustration, beneath the member 14 and fastening them by any suitable means, such as belt clips, onto the belt 27. The opposite ends of the pulling belts may then be fastened to spool like winding members 31, only one of which is shown, for clearness of illustration, each of such spools by preference accommodating only one such belt. The pulling belts are made to a very definite length, the length of each of these belts being such that when completely wound on the spool, it will substantially fill the groove in the spool. This arrangement then provides for a smooth flat surface upon which the oncoming, cut belting may be wound. Each spool is removably or detachably fastened to the driving shaft 32 by means of a key (not shown) so that after a belt has been cut and rolled on a spool, it may be easily removed from the shaft by removing the key, and withdrawing the roll of belting cut to width, with or without the spool, from the shaft.

After the rolled belt has been removed from the shaft, the cut edge or edges of the belt may be treated or sealed, as heretofore suggested, with any suitable composition filler, so as to prevent foreign matter from entering the raw edge of the material. The spools or winding elements are desirably constructed of low-cost material, and so may be left in the roll of cut belting along with the narrow pull-in belt, thereby eliminating the necessity of rerolling the belt before use or sale.

It will be apparent that various changes may be made in the construction and arrangement of parts without departing from the spirit and full intended scope of this invention as defined by the appended claims.

I claim as my invention:

1. In a device for cutting a flexible sheet material, a table portion having a series of apertures therein, a horizontal bar vertically spaced from said table, said bar having a series of knife receiving recesses in register with said table apertures, a pair of winding members disposed at opposite sides of the table portion having means thereon to draw the sheet material over the table, a knife, supported by said bar and projecting into one of the table apertures, and a key member longitudinally disposed with respect to said bar for fixedly positioning said knife.

2. In a device for cutting flexible sheet material into portions of predetermined widths, a table portion for the material being cut, a knife support extending transversely of, and spaced from said table, a stationary cutting knife carried by said support and projecting into said table portion, a plurality of seats in said table portion, for receiving said knife, means for moving the material against the cutting edge of the knife and between said table and support, said means including a rotatable shaft and a strap adapted to be connected between the shaft and material under treatment.

3. In a device for cutting pliable sheet material into predetermined widths, a frame for the material under treatment, including a table portion, a stationary knife projecting from said table portion transversely of the material under treatment, a plurality of seats for selectively receiving said knife, guides associated with the table portion, for the material thereon, a rotatable shaft disposed adjacent the table portion, a winding member carried by said shaft, and a pull-in member secured to said winding member and to the material to be cut, said winding member and pull-in member coacting to draw the material under treatment across said table portion and transversely to said knife.

EDWARD C. TEUSCHER.